United States Patent [19]
Owen

[11] Patent Number: 5,437,171
[45] Date of Patent: Aug. 1, 1995

[54] DEVICE FOR PREVENTING FREE ROTATION OF A WHEEL OF A STATIONARY VEHICLE

[76] Inventor: Joseph L. Owen, 3224 Stuart Way, Napa, Calif. 94558

[21] Appl. No.: 109,615

[22] Filed: Aug. 20, 1993

[51] Int. Cl.$^6$ .............................................. B62H 5/14
[52] U.S. Cl. .......................................... 70/14; 70/18; 70/226; 188/32
[58] Field of Search ............... 70/14, 18, 19, 225–228, 70/237, 259; 188/32, 36, 37, 62; 410/20, 30, 49

[56] References Cited

U.S. PATENT DOCUMENTS

| | | | |
|---|---|---|---|
| 1,688,496 | 10/1928 | Holtzman | 70/226 |
| 3,687,238 | 8/1972 | Carpenter | 70/18 X |
| 3,695,071 | 10/1972 | West | 70/225 |
| 4,723,426 | 2/1988 | Beaudoin | 70/18 X |
| 4,819,462 | 4/1989 | Apsell | 70/14 |
| 4,854,144 | 8/1989 | Davis | 70/226 |
| 4,878,366 | 11/1989 | Cox | 70/19 X |
| 4,913,265 | 4/1990 | Richards | 70/226 X |
| 5,176,013 | 1/1993 | Kutauskas | 70/18 |
| 5,214,944 | 6/1993 | Wolthoff | 70/226 |
| 5,301,527 | 4/1994 | Pollard | 70/237 X |
| 5,301,817 | 4/1994 | Merritt | 211/20 X |
| 5,302,063 | 4/1994 | Winsor | 188/32 X |
| 5,333,477 | 8/1994 | Davis | 70/14 X |

FOREIGN PATENT DOCUMENTS

| | | | |
|---|---|---|---|
| 189366 | 7/1986 | European Pat. Off. | 70/237 |
| 2279590 | 2/1976 | France | 70/14 |
| 1810854 | 1/1973 | Germany | 410/30 |
| 2110175 | 6/1983 | United Kingdom | 70/14 |
| 2112725 | 7/1983 | United Kingdom | 70/226 |
| 2204288 | 11/1988 | United Kingdom | 70/225 |
| 2206552 | 1/1989 | United Kingdom | 70/226 |

*Primary Examiner*—Peter M. Cuomo
*Assistant Examiner*—Suzanne L. Dino
*Attorney, Agent, or Firm*—Harold D. Messner

[57] ABSTRACT

A wheel securing device, comprises L-shaped and U-shaped hooks extending from an articulated central platform positioned across the full diameter of the tire and wheel, wherein: (i) base legs of a pair of L-shaped hooks attach to and extend from the central platform into contact with the tread of the tire and (ii) radial legs of the L-shaped hooks contact the interior side wall of the tire. An U-shaped hook is also attached to the platform via a planar arm, and includes longer and shorter legs contacting opposite side walls of the tire, and a base leg in contact with the tire tread. Since the planar arm is pivotally attached to the top wall of the platform, movement of the arm carries the U-shaped hook into and out of contact with the tread of the tire to provide convenient attachment and removal of the securing device relative to the tire. Such movement also carries an opening in the planar arm into alignment with similar openings in a pair of eared supports attached to and extending from the top wall of the platform wherein a padlock can be added to prevent removal of the hooks and platform relative to the tire and wheel. A shield is also attached to the central platform in axial alignment with the central region of the wheel and includes a U-shaped cap supporting a pair of studs that extend through the pivot arm of the platform. Since the U-shaped cap hides the central region of the wheel, lug fasteners also positioned in such central region for attachment of the wheel relative to the wheel rotor, are likewise shielded from outside manipulation.

8 Claims, 3 Drawing Sheets

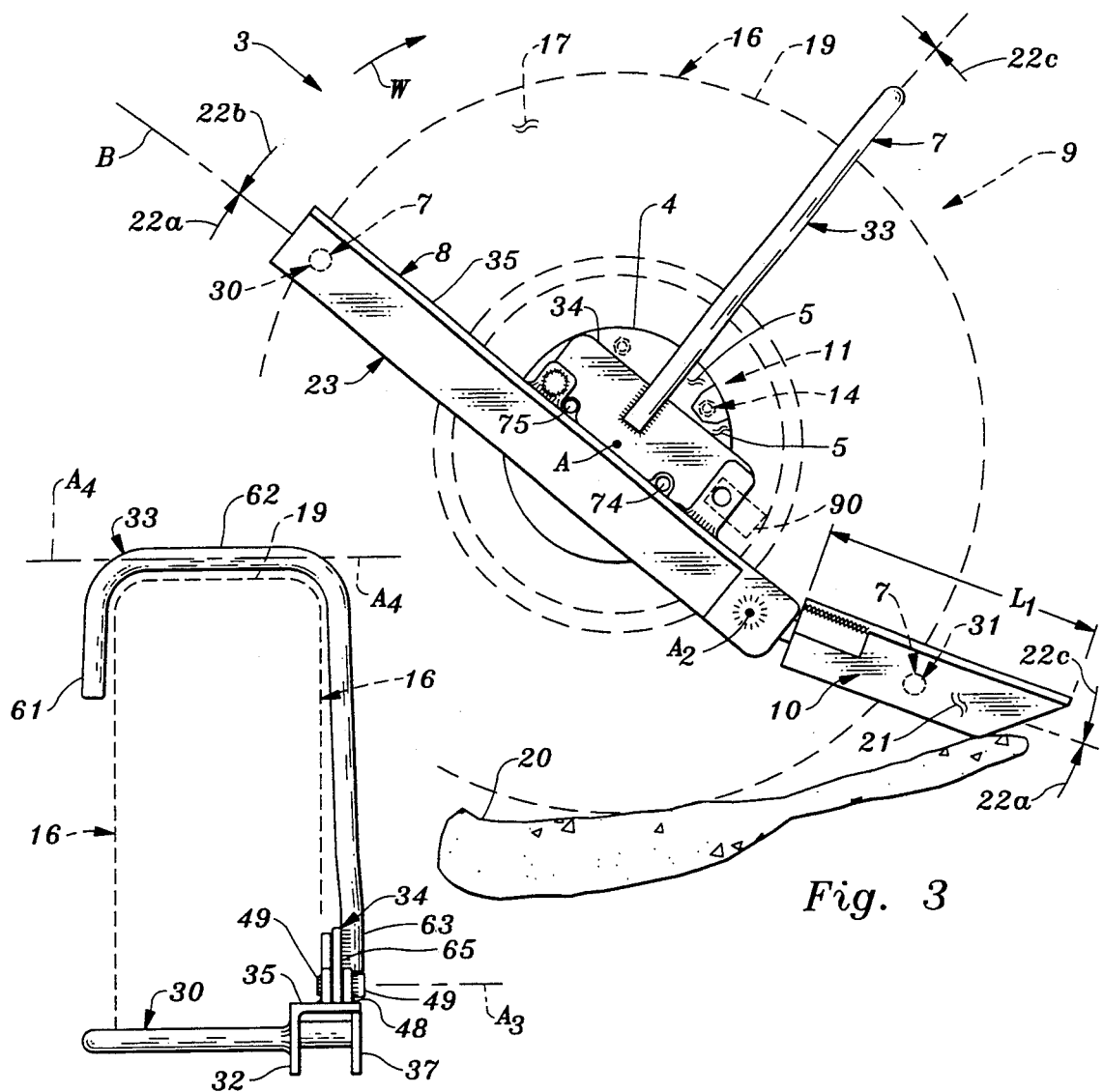
Fig. 3
Fig. 4
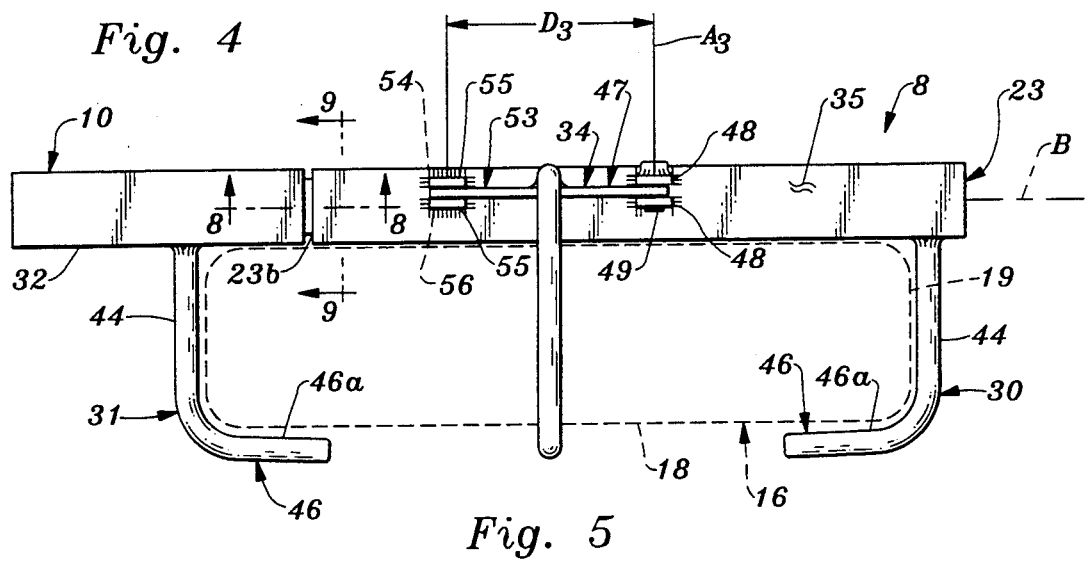
Fig. 5

DEVICE FOR PREVENTING FREE ROTATION OF A WHEEL OF A STATIONARY VEHICLE

SCOPE OF THE INVENTION

This invention relates to means that prevents free movement a stationary vehicle beyond a few feet or so in either direction relative to a tangential point of contact between a tire attached to a wheel of the vehicle and its supporting surface and more particularly, to a device that prevents free rotation of such tire and wheel combination after the device has been attached via a series of L- and/or U-shaped hooks radially spaced about the circumferential extending tread of a tire from which an articulated platform is positioned—cantilever style—across the side wall of the tire off-center from the axis of rotation of the wheel.

In one aspect, free rotation of the wheel is prevented by the combination of the fastening of the hooks at the circumferential edge of the tire and permitting an end segment of the cantilevered platform to undergo limit rotation via contact the supporting surface of the vehicle. After the wheel and tire have undergone limited rotation, say a quarter-, half or nearly a full-revolution (in a selected direction) relative to a common axis of rotation, such end segment (which extends well beyond the circumferential tread of the tire) undergoes opposite direction rotation which reduces the effective diameter of the hooks so that the device of the invention prevents further rotation of the tire and wheel. In another aspect, removal of the wheel and tire (and the device of the invention so that the vehicle can roll freely from its mooring or grounding site), is prevented by means of a shield attached at the center of the platform that extends over and hides the central region of the wheel where the lugs and fasteners (that attach the wheel relative to the wheel rotor of the vehicle) are positioned.

BACKGROUND OF THE INVENTION

There are various devices presently available that prevent rotation of a wheel of a stationary vehicle. Of those available, I have found them to have these common characteristics: they are heavy and bulky so that stowage and transport to the site where is the vehicle is located, is difficult; they are complicated to attach thereby limiting usage to professionals or semi-professionals; and they are relatively expensive to purchase, especially to the average homeowner or vacationers.

Homeowner and/or vacationers also have encountered problems related to securing their unhitched boat or camper trailers. Many carry padlocks and chains used to secure their trailers relative to a tree, post or the like. However, often a securing structure is not available. In those occasions, the trailer is left unsecured.

Hence there is a need for a low cost, easily portable wheel securing device usable by the average homeowner and/or vacationer without the need for a securing structure of any kind.

SUMMARY OF THE INVENTION

The present invention relates a low cost, easily portable wheel securing device that prevents free rotation of the vehicle relative to a tangential point of contact between a tire attached to a wheel of the vehicle and its supporting surface that establishes the mooring site of the vehicle. More particularly, the present invention relates to a device that prevents free rotation of such tire by the attachment of a series of hooks extending from an articulated central platform positioned at and across the full diameter of the tire and wheel, i.e., a pair of L-shaped hooks are positioned so that base legs attach to and extend from a side wall of the platform and contact the tread region of the tire, and a U-shaped hook is centrally attached to the platform via a planar arm in which a longer leg of the pair of upright legs contacts the exterior side wall of the tire but is angularly spaced from the L-shaped hooks. Remaining radial legs of the pair of L-shaped hooks as well as the shorter leg of the upright legs of the U-shaped hook, both make contact with interior side wall of the tire. The base leg of the U-shaped hook makes contact with the tread region of the tire. Since the planar arm is pivotally attached to the top wall of the platform, movement of the arm carries the U-shaped hook into and out of contact with the tread region of the tire to provide convenient attachment and removal of the invention relative to the tire. In the same vein, such movement also carries an opening in the planar arm into alignment with similar openings in a pair of eared supports attached to and extending from the top wall of the platform.

The L-shaped and U-shaped hooks, pivot arm and platform establish two working states: an open state in which pivot arm of the platform (attached to the third hook) is pivoted away from the eared supports so that there is sufficient clearance to attach or remove the device of the invention from contact with the tire, and a closed state in which the pivot arm of the platform is connected to the eared supports in semi-permanent fashion, as by a padlock having a portion that passes through the aligned openings of the pivot arm and eared supports. In the closed state, the L-shaped and U-shaped hooks are snugly attached at the circumference of the tire to define a series of annular spaces therebetween.

In the closed state, free rotation of the tire (and wheel) is prevented by the combination of (a) fastening of the L-shaped and U-shaped hooks at three points about the circumference of the tire, such contact points being greater than 90 degrees owing to the fact that the working planes of the hooks intersect at a position that are offset a radial distance relative to the axis of rotation of the tire and wheel and (b) permitting an end segment of the platform to contact the supporting surface of the vehicle after the wheel and tire undergo limited rotation, say up to a full revolution of the tire and wheel relative to a common axis of rotation, such contacting end segment (i) extending beyond the circumference of the tire, (ii) pivotally attaching to the central segment of the platform and (iii) including a midportion permanently attached to one of the pair of L-shaped hook. As the pivoting end segment is brought into contact with the supporting surface of the vehicle, the end segment is pivoted upward relative to such supporting surface. Since the radius of rotation of such end segment is much shorter than the radius of the tire tread, the base leg of the L-shaped hook attached to the pivoting end segment is brought into wedging contact against the tread of the tire. As a result, the rotation of the wheel and tire is limited as the L-shaped hook wedges against the tread of the tire, dislocating a portion of the tire inwardly toward its axis of rotation bring the remaining hooks into firmer contact with the tire tread.

In another aspect of the invention, removal of the wheel and tire (and the device of the invention so that the vehicle can roll freely from its grounding site), is prevented by means of a shield attached at the central segment of the platform. Such shield is located between the platform and the central region of the wheel and includes a U-shaped cap having an end wall supporting a pair of studs that extend through a pair of openings in the pivot arm of the platform. In that way, the U-shaped support is constructed—in the closed state—to extend over and hide the central region of the wheel where the lug fasteners (that attach the wheel relative to the wheel rotor of the vehicle) are positioned.

BRIEF DESCRIPTION OF THE DRAWINGS

FIG. 3 is a side view of the device of the invention in combination with the tire and wheel of FIG. 2 illustrating the wedging action of the device relative to a supporting surface;

FIG. 4 is a detail side view of the device of FIGS. 1-3 minus the shield, i.e. of a subassembly comprising the series of hooks and platform of FIG. 1;

FIG. 5 is a top view of the subassembly of FIG. 4;

DETAILED DESCRIPTION OF THE INVENTION

Figure 1:
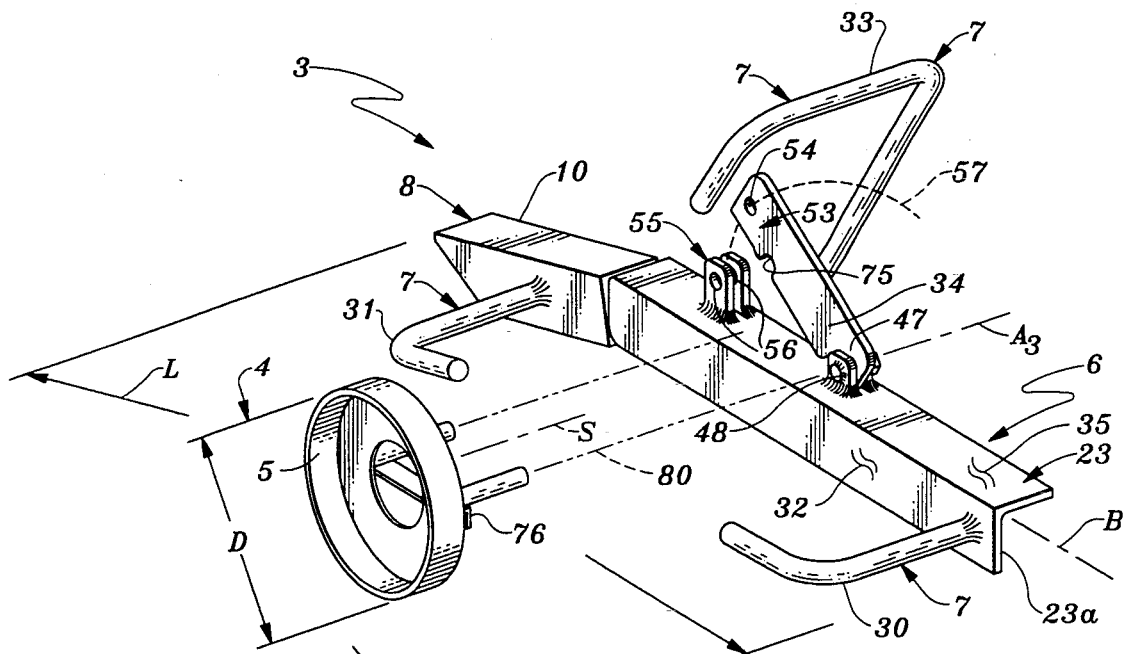
FIG. 1 is a perspective view of the device of the invention, including a series of hooks extending from a platform and a shield releasably attachable to the platform.

FIGS. 1 illustrates device 3 of the present invention that is seen to comprise separate, compact elements for convenient stowage, including: a shield subassembly 4 including a cap 5 of U-shaped cross section and a tire mounting subassembly 6, the latter including a series of L- or U-shaped hooks generally indicated at 7 attached to central platform 8. The purpose of device 3: to provide a low cost, compact, easily portable wheel securing means that prevents free unauthorized movement of a vehicle from its mooring or grounding site. Since only end segment 10 of the central platform 8 extends well beyond the circumferential edge of a tire after attachment (as explained in more detail below) the length dimension L of the platform 8 is only slightly beyond that of the tire diameter. Furthermore, because the remaining dimensions of the platform 8 and series of hooks 7 are formed from conventional angle iron and construction rod, respectively, and the diameter D of the cap 5 is also only slightly larger than the diameter of lugs of the wheel (also explained below), the resulting device 3 is of a relatively compact, low cost, rugged design but is easily stowable for transport for usage at the mooring site.

Figure 2:
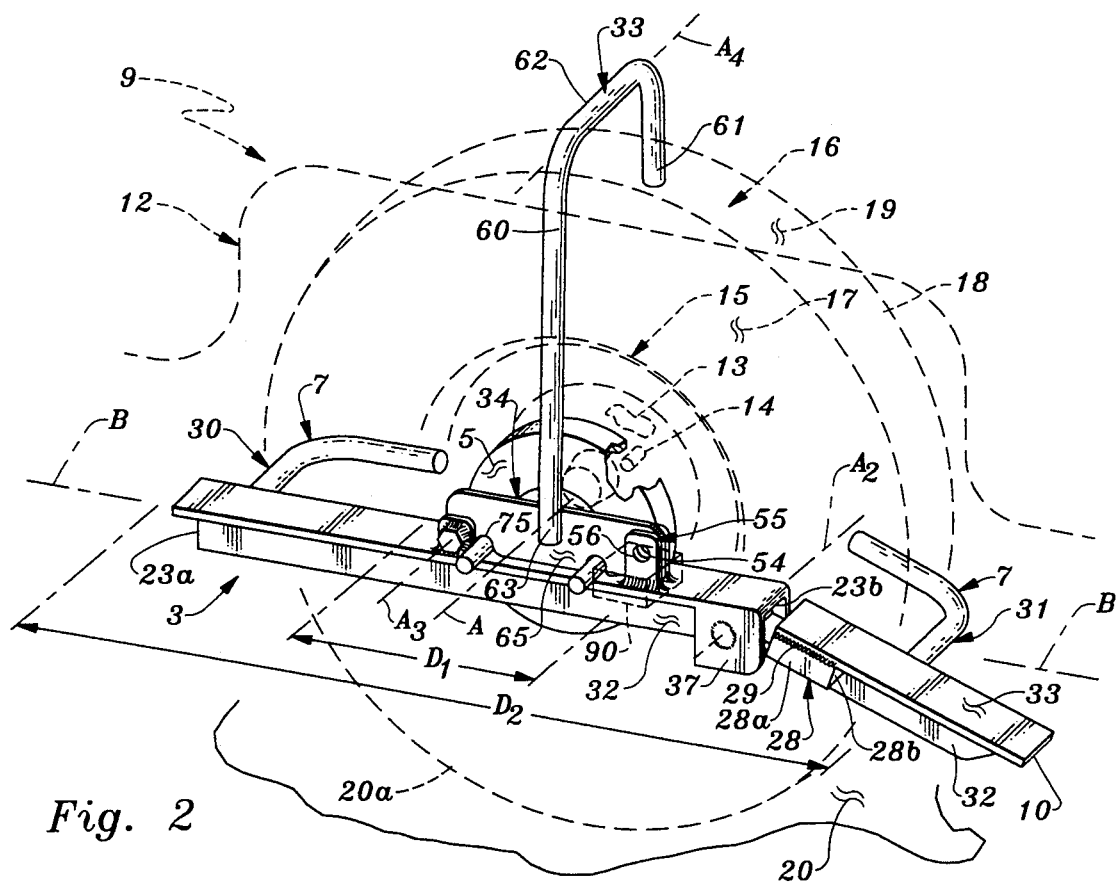
FIG. 2 is another perspective view of the device of the invention attached about a tire and wheel of a vehicle, the latter being attached to a wheel rotor by a series of fasteners and coverable by the shield of FIG. 1.

FIGS. 2 and 3 show the device 3 in more detail in its operating site, viz., at its mooring site for use in conjunction with a vehicle 9.

The vehicle 9 (FIG. 2) is conventional and can be self-propelled or can be towable such as a trailer. The vehicle 9 can comprise a body that includes a fender 12 and a frame (not shown) in which a wheel rotor 13 and lug-type fasteners 14 are used for attaching a wheel 15 and associated tire 16 relative to the frame. The exterior diameter of a circle defining the fasteners 14 is D1 which is seen to be less the diameter D of the cap 5 of the shield subassembly 4, (FIG. 1) for reasons explained below. The tire 16 is conventional and includes exterior and interior side walls 17, 18, respectively and a tread section 19 extending across the side walls 17, 18 and defining an outside diameter D2. The tread section 19 is also seen to be in contact with supporting surface 20 for the vehicle 9, say at sector 20a. Note that the latter contact establishes the mooring site for the vehicle 9, such site being measured with respect to the sector 20a after attachment of the device 3 to the vehicle 9 has occurred.

As shown in FIG. 3, the series of L- or U-shaped hooks 7 of the device 3 are shown radially spaced about the circumferential extending tread section 19 to define a series of arcuate spaces 22a, 22b, 22c where (in FIG. 3) it is seen that $22a > 22b > 22c$ but (in FIG. 2) note that $22a > 22c > 22b$. The articulated platform 8 is seen to attach to and depend from the series of hooks 7 and includes a longitudinal axis B, and a main segment 23 pivotally attached to the end segment 10 previously mentioned.

The main segment 23 is positioned across and in contact with the exterior side wall 17 of the tire 16 at two separate locations as well as being coextensively located adjacent to the central region 11 of the wheel 15 so that the lug type fasteners 14 are hidden behind the cap 5. Such positioning of the main segment 23 of the platform 8 is seen to be radially off center with respect to axis of rotation A of the wheel 15, however, as depicted in FIGS. 2 and 3, being positioned slightly below such axis of rotation A but normal to longitudinal axis B of the platform 8.

The end segment 10 is seen to be also positioned in contact with the exterior side wall 17 of the tire 16. It is constructed to define a length L1 that allows an end section 21 to extend well beyond the tread section 19 of the tire 16.

More particularly in FIG. 2, the device 3 of the present invention prevents free rotation of the wheel 15 and tire 16 after attachment of the L-shaped or U-shaped hooks 7 at the tread section 19 of the tire 16 (and dependent positioning of the central platform 8) has occurred. The series of hooks 7 are provided with unitized operation because of their shape, construction and mode of attachment to the articulated central platform 8. In this regard with reference to FIG. 1, the series of hooks 7 include a pair of L-shaped hooks 30, 31 attached along the longitudinal axis B of the platform 8, such attachment occurring at side wall 32 of the main segment 23 and end segment 10 of the platform 8, respectively, as explained below. A U-shaped hook 33 is more centrally positioned relative to the longitudinal axis B of the platform 8 at the main segment 23, wherein attachment is effected via a pivot arm 34. The pivot arm 34 is positioned at top wall 35 of the main segment 23. The side and top walls 32, 35 are formed of conventional angle iron, and integrally attach at their ends to form the traditional L-shaped cross section through most of the length of main section 23 except where end segment 10 is pivotally attached. Note that the L-shaped hook 31 attaches to the mid-portion of the end segment 10, while the L-shaped hook 30 attaches to the main section 23 near its remote end 23a. Where the end segment 10 attaches to the main section 23, a second side wall 37 (see FIG. 2) is added to pivotal stability as explained below.

FIGS. 2-5, 8 and 9 show the end segment 10 in more detail, and more particularly how the end segment 10 is attached relative to main section 23 and how it performs wedging action with respect to supporting surface 20.

As shown in FIGS. 4 and 5, at end 23b of the main section 23 is positioned the second side wall 37. As detailed in FIG. 9, the second side wall 37 includes a central opening 24 in parallel longitudinal alignment with opening 25 in the adjacent side wall 32 of the main segment 23. A pin 38 is placed interior of the side walls 32, 37 and constructed to extend within the openings 24, 25 where welds 26a, 26b are added to permanently attach the pin 38 relative to the walls 32, 37. About the pin 38 is placed a hinged tongue 27, see FIG. 8, that includes a cylindrical hinge 27a rotatable about the pin 38 to define an axis of rotation A2. Attached to the hinge 27a is a planar arm 27b that in turn is attached via L-shaped support 28 to the top and side walls 35, 32 of the end segment 10. That is, as shown in FIG. 2, the L-shaped support 28 includes a first leg 28a longitudinally extending along the longitudinal axis of symmetry B of the main segment 23 and a transverse leg 28b. Various welds generally indicated at 29 are provided to attach the L-shaped support 28 relative to the side and top walls 32, 35 as well as to attach planar arm 27b of the tongue 27 (see FIG. 8) relative to the L-shaped support 28.

In operation when the end and main segments 10, 23 are mounted to the tire 16 via the L-shaped and U-shaped hooks 30, 31 and 33 as shown in FIG. 2, the end segment 10 pivots toward the supporting surface 20, such rotation about axis of rotation A2 being inducted by gravity and limited by the surface contact occurring between the side wall 32 of end segment 10 with the side wall 32 of the main section 23. As shown in FIG. 3, after the tire 16 and wheel 15 have undergone rotation in the direction of arrow W about axis of rotation A, the end segment 10 contacts the supporting surface 20 and undergoes opposite rotation about the axis of rotation A2, such rotation being limited by surface contact of the L-shaped hook 31 with the tread section 19 of the tire 16 to define a wedging working state for the invention as explained below.

FIGS. 4 and 5 show the L-shaped and U-shaped hooks 30, 31 and 33 in more detail. As shown, the pair of L-shaped hooks 30, 31 are attached to the main section 23 and to the end segment 10, respectively, along the longitudinal axis B of the platform 8 as previously described. In the radial direction with respect to axis B, they are seen to be spaced about the circumferential extending tread section 19 of the tire 16. The U-shaped hook 33 is seen to be also located along the longitudinal axis B but is positioned intermediate of the pair of L-shaped hooks 30, 31 to define the series of arcuate spaces 22a, 22b, 22c as previously mentioned with reference to FIG. 3.

Each of the pair of L-shaped hooks 30, 31 have a base leg 44 and a radial leg 46. The base leg 44 attaches to and extends from the side wall 32 of the main segment 23 and end segment 10, respectively. I.e., the base leg 44 of the hook 30 extends from and is attached to main section 23, while the base leg 44 of the hook 31 extends from articulated end segment 10. Both base legs 44 extend in a common transverse direction however relative to the longitudinal axis B, and make surface contact with the tread section 19 of the tire 16.

The radial leg 46 of each of the pair of L-shaped hooks 30, 31 extends from the base leg 44 in a direction coextensive of the longitudinal axis B of the platform 8. Each radial leg 46 also has a sector portion 46a in surface contact with the interior side wall 18 of the tire 16.

As shown in FIGS. 1, 4 and 5, the U-shaped hook 33 is attached to the main segment 23 via pivot arm 34. The pivot arm 34 is rectangular in cross section and has an end section 47. The end section 47 is seen to pivotally attach to a pair of studs 48 welded to the top wall 35 of the main segment 23. For this purpose, a pivot pin 49 is constructed to attach to the studs 48 and extend through an opening (not shown) in the end section 47 of the pivot arm 34. A pivot axis of rotation A3 for the arm 34 is thus established parallel to the axis of rotation A and A2 of the wheel 15 and the end segment 10, respectively, see FIG. 2. Returning to FIG. 5, note that an opposite end 53 of the planar arm 34 is also provided with an opening 54. The opening 54 defines an axis of symmetry displaced a distance D3 from the axis of rotation A3 of the pivot arm 34. Also displaced from the axis of rotation A3 is a pair of cared supports 55. The supports 55 attach to and extend from the top wall 35 of the main segment 23. Central of the eared supports 55 are a pair of openings 56 having coincident axes of symmetry located a distance D3 from the axis of rotation A3 of the planar arm 34. As a result as shown in FIG. 1, the rotated position of the planar arm 34 carries opening 54 along an imaginary arc 57 from a full open position (to allow the device 3 to be easily attached or removed relative to the tire 16) to a full closed position when such opening 54 is aligned with the pair of openings 56 of the eared supports 55.

Since the U-shaped hook 33 is permanently attached over a mid-portion of the pivot arm 34, the arm 34 (and hence the U-shaped hook 33) can be provided with pivotal movement relative to top wall 35 of the platform 8. The position of the pivot arm 34 establish the working states of the invention as explained below.

Returning to FIGS. 2 and 4, note that the U-shaped hook 33 also has first and second upright legs 60 and 61 sandwiched between a transverse base leg 62. Note that first upright leg 60 is much longer than the second leg 61, and that the first upright leg 60 has an end section 63 that is attached, as by welding to broad surface 65 of the pivot arm 34. The shorter second leg 61 defines a length that matches that of the radial legs 46 of the pair of the L-shaped hooks 30, 31. Similarly, the length of the base leg 62 between the upright legs 60, 61 is seen to be matched to that of the base legs 44 of the pair of L-shaped hooks 30, 31. The base leg 62 also is seen to define an axis of symmetry A4 parallel to the pivot axis A3 of the pivot arm 34.

Figure 6:
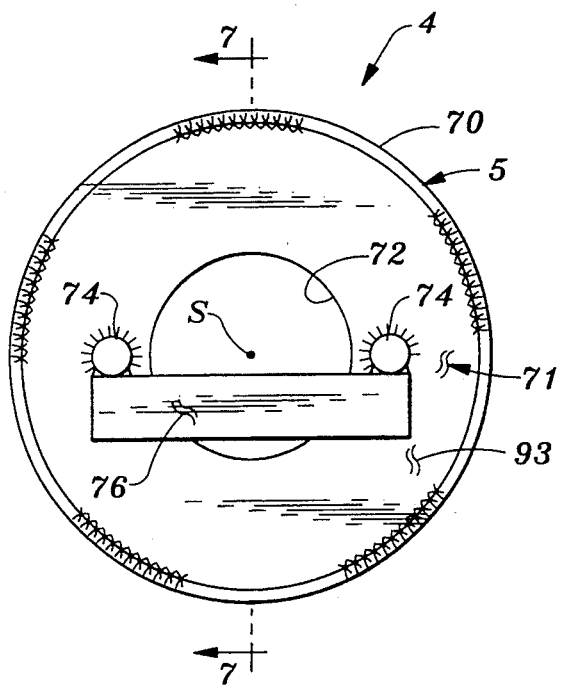
FIG. 6 is detail top view of the shield of FIGS. 1-3.
Figure 7:
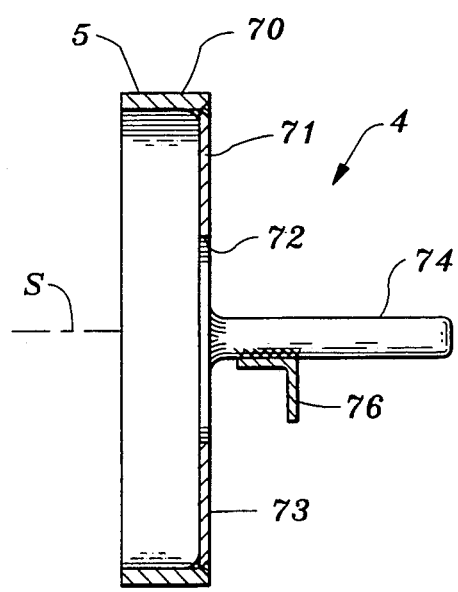
FIG. 7 is a section taken along line 7—7 of FIG. 6.
Figure 8:
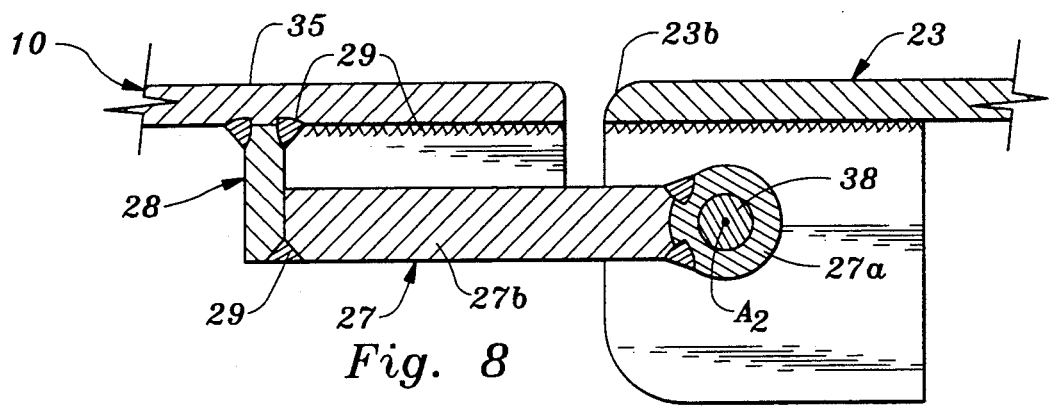
FIGS. 8 and 9 are sections taken along lines 8—8 and 9—9, respectively of FIG. 5 of the subassembly.
Figure 9:
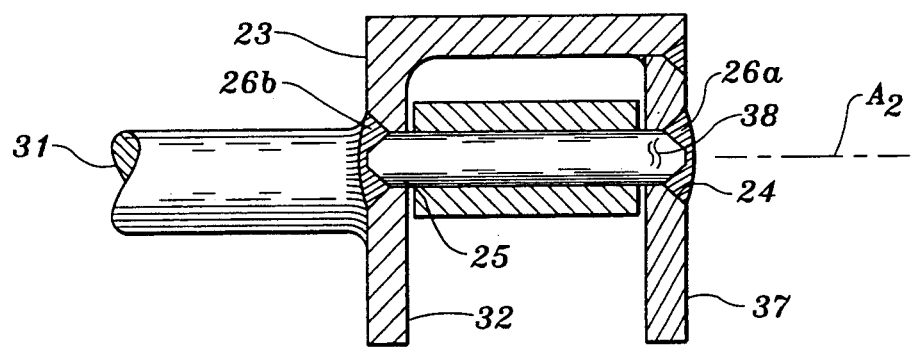

FIGS. 6 and 7 show the shield subassembly 4 in more detail. As shown, the shield subassembly 4 is seen to include the cap 5 previously mentioned. As shown, the cap 5 defines an axis of symmetry S and includes a side wall 70 and an end wall 71 formed with a central opening 72, all symmetrically disposed about the axis of symmetry S. At exterior surface 73 of the end wall 71 is attached a pair of studs 74 extending parallel to the axis of symmetry S. The purpose of studs 74: to extend through openings 75 in the pivot arm 34, see FIGS. 1 and 2 and to secure the shield subassembly 4 relative to the tire mounting subassembly 6. A L-shaped stop 76 is welded to the studs 74 to impinges against the side wall 32 of the main segment 23 (FIG. 1) to stabilize such attachment by preventing tipping about the axis of symmetry S.

OPERATIONAL ASPECTS

The operations of the tire mounting subassembly 6 of the device 3 including the series of hooks 7 including pivot arm 34 and the platform 8, will now be discussed to establish the working states of the present invention.

(i) An open stowable state is shown in FIG. 1 in which pivot arm 34 of the platform 8 (to which the U-shaped hook 33 is attached) is shown at its most remote position relative to the platform 8 away from the top wall 35 of the platform 8. In such position, the shield subassembly 4 is decanted from the main segment 23. Note also that the end section 53 of the planar arm 34 adjacent to the opening 54 is well clear of the top wall 35 and of the eared supports 55. After the shield subassembly 4 is advanced along imaginary lines 80, to a position atop top wall 35 of main segment 23, with the pivot arm 34 is the position shown, there is sufficient clearance to attach or remove the series of hooks 7 and platform 8 relative to the tire as discussed above;

(ii) An initial closed working state is shown in FIG. 2 in which pivot arm 34 has been relocated from the position shown in FIG. 1 to a position in which the planar arm 34 is lodged between the eared supports 55 wherein opening 54 of the arm 34 is transversely aligned with openings 56 in the support 55 and then secured thereto in semi-permanent fashion, as by means of a lock 90 shown in phantom line in FIGS. 2 and 3, a portion of which passes through such aligned openings 54, 56. In that way the series of hooks 7 are snugly attached in unitized attachment relative to central platform 8 at three locations about the tread region 19 of the tire 16, such contact points being greater than 90 degrees owing to the fact that working planes defined by the base and radial legs 44, 46 of the L-shaped hooks 30, 31 and by the legs 60, 61, and 62 of the U-shaped hook 33, intersect at a position that is offset a radial distance below the axis of rotation A of the wheel 15; and (iii) A wedging closed working state is shown in FIG. 3 in which free rotation of the tire 16 is prevented. In such working state, the end section 21 of the end segment 10 contacts the supporting surface 20 as the tire 16 undergoes rotation in the direction of arrow W. As a result, the end segment 10 undergoes opposite rotation to attain the position shown. I.e., when the tire 16 undergoes rotation in the direction of arrow W, the end section 21 is pivoted upward by reaction forces generated by its contact with such supporting surface 20. Since the radius of rotation of the end segment 10 is much shorter than the radius of the tire tread 19 and due to the fact that its axis of rotation A2 is radially disclosed relative to the axis of rotation A of the wheel 156 and tire 16, the base leg 44 of the L-shaped hook 31 attached to the pivoting end segment 10 is brought into wedging contact against the tread region 19 of the tire 16. As a result, the rotation of the wheel 16 and associated tire 15 is limited as the L-shaped hook 31 wedges against the tread region 19 of the tire 16, dislocating a portion of the tire 16 and shortening the distance between the remaining U-shaped hook 33 and L-shaped hook 30 to bring them into firmer contact with the tread region 19 of the tire 16.

In another aspect of the invention, removal of the wheel 15 and tire 16 (and the device 3 of the invention so that the vehicle 9 can roll freely from its grounding site), is prevented by means of the shield subassembly 4 previously described. The shield subassembly 4 is attached to the pivot arm 34 via placement of the studs 74 atop the top wall 35 of the main segment 23, see FIG. 3, interior of the openings 75 at the edge of the planar arm 34. In such position, the shield subassembly 4 is located between the main segment 23 and the central region 11 of the wheel 15. In that way, the cap 5 is constructed to the initial and secondary closed state, to extend over and hide the lug-fasteners 14 at the central region 11 of the wheel 16 whereby preventing their removal.

While the invention has been described with sufficient clarity to enable one skilled in the art to make and use the same, it is evident that such person would be aware of certain modifications and additions that could be made thereto. Such modifications and additions are sought to be included within the spirit of the following claims.

What is claimed is:

1. A wheel securing device comprising a main locking subassembly including an articulated central platform defining a longitudinal axis, and a series of L-shaped and U-shaped hooks extending from said central platform, said platform including a main segment and an end segment, said end segment being pivotally attached to said main segment coextensive with said longitudinal axis, said L-shaped hooks including first and second L-shaped hooks attached to opposite ends of said main and end segments along said longitudinal axis, said L-shaped hooks also including (i) base legs attached to and extending transversely from said main and end segments and (ii) radial legs longitudinally extending parallel to said longitudinal axis, said U-shaped hook being attached to said main segment near a mid-region and including a planar arm pivotally attached at one end to said main segment, and including a longer leg of a pair of upright legs radially extending relative to said longitudinal axis, a shorter leg parallel to said longer leg and a base leg extending transversely of said longitudinal axis, wherein movement of said planar arm carries said U-shaped hook in various working states providing convenient attachment and removal relative to a tire of a vehicle, said planar arm being rectangular in cross section and including a first end pivotally attached to said main segment for rotation about a pivot axis perpendicular to said longitudinal axis and a second end provided with an opening, said main segment also including a pair of radially extending eared supports having openings alignable with said opening in said pivot arm to define a closed working state.

2. The device of claim 1 with the addition of a lock attached through said aligned openings of said pivot arm and said eared supports to prevent removal of said hooks and platform relative to said tire when said device is attached thereto.

3. The device of claim 1 with the addition of a shield subassembly releasably attached to said main segment of said central platform, said shield subassembly including a U-shaped cap having an end wall, and a pair of studs extending from said end wall in a direction transverse to said longitudinal axis of said platform, said pivot arm of said U-shaped hook including a pair of opening through which said studs extend to releasably attach said shield subassembly relative to said central platform.

4. In a wheel securing device, the combination comprising a vehicle, a wheel having a central region and lug-fasteners formed in a circle of diameter D in said central region for mounting said wheel to said vehicle and a tire circumferentially mounted to said wheel, said tire including interior and exterior side walls and a tread region, said tread region of said tire being in contact with a support surface for said vehicle, a main locking subassembly including an articulated central platform positionable at and across the full diameter of said tire and defining a longitudinal axis, and a series of L-shaped and U-shaped hooks extending from said central platform, said platform including a main segment and an end segment, said end segment being pivotally attached to said main segment coextensive with said longitudinal axis and extending beyond the circumference of said tire, said L-shaped hooks including first and second L-shaped hooks attached to opposite ends of said main and end segments, said L-shaped hooks also including (i) base legs attached to and extending transversely from said main and end segments for contact with said tread region of said tire and (ii) radial legs longitudinally extending into contact with said interior side wall of said tire, said U-shaped hook including a pivotal planar arm attached to said main segment near a mid-region thereof and comprising a pair of upright legs in contact with said side walls of said tire, and a base leg in contact with said tread region of said tire wherein movement of said planar arm carries said U-shaped hook into and out of contact with the tread region of said tire to provide convenient attachment and removal relative to said tire, said planar arm being rectangular in cross section and including a first end pivotally attached to said main segment for rotation about a pivot axis perpendicular to said longitudinal axis of said platform and a second end provided with an opening, said main segment also including a pair of radially extending eared supports having openings alignable with said opening in said pivot arm to define a closed working state for said device.

5. The combination of claim 4 with the addition of a lock attached through said aligned openings of said pivot arm and said eared supports to prevent removal of said hooks and platform relative to said tire.

6. The combination of claim 4 with the addition of a shield subassembly releasably attached to said main segments of said central platform, said shield subassembly being positioned including a U-shaped cap having a side wall of diameter D1 and an end wall, and a pair of studs extending from said end wall in a direction transverse to said longitudinal axis of said platform, said pivot arm of said U-shaped hook including a pair of openings through which said studs extend to releasably attach said shield subassembly relative to said central region of said wheel whereby said cap fits over said lug-fasteners to prevent unauthorized disconnection.

7. The combination of claim 6 in which said diameter D1 of said side wall of said cap of said shield subassembly is greater than said diameter D of said circle of lug-fasteners attaching said wheel relative said vehicle.

8. The combination of claim 6 in which said end wall of said cap of said shield subassembly also has a central opening extending therethrough to bring said wheel and said cap of said shield subassembly into close alignment in said closed working state.

* * * * *